(12) United States Patent
Lee

(10) Patent No.: US 12,271,542 B2
(45) Date of Patent: Apr. 8, 2025

(54) TOUCH-TYPE PANEL STRUCTURE FOR VEHICLE AND METHOD OF MANUFACTURING SAME

(71) Applicant: HYUNDAI MOBIS CO., LTD., Seoul (KR)

(72) Inventor: Kyeong Jun Lee, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/062,549

(22) Filed: Dec. 6, 2022

(65) Prior Publication Data

US 2023/0367407 A1 Nov. 16, 2023

(30) Foreign Application Priority Data

May 11, 2022 (KR) .................. 10-2022-0057925

(51) Int. Cl.
  *G06F 3/041* (2006.01)
  *B60K 35/00* (2006.01)
  *B60K 35/10* (2024.01)

(52) U.S. Cl.
  CPC ............. *G06F 3/041* (2013.01); *B60K 35/00* (2013.01); *B60K 35/10* (2024.01); *B60K 2360/1434* (2024.01); *G06F 2203/04103* (2013.01)

(58) Field of Classification Search
  CPC ........... G06F 3/041; G06F 2203/04103; G06F 3/044; G06F 3/0416; B60K 35/00;
  (Continued)

(56) References Cited

U.S. PATENT DOCUMENTS 5,744,758 A * 4/1998 Takenouchi ......... H05K 3/4069
  428/209
2005/0052426 A1* 3/2005 Hagermoser ........ H03K 17/962
  345/173
(Continued)

FOREIGN PATENT DOCUMENTS

JP  2009073008 A * 4/2009
KR  2009-0071602   7/2009
(Continued)

OTHER PUBLICATIONS

English Language Abstract of KR 10-2146739 published Aug. 21, 2020.
(Continued)

*Primary Examiner* — Temesghen Ghebretinsae
*Assistant Examiner* — Sosina Abebe
(74) *Attorney, Agent, or Firm* — DLA PIPER LLP US

(57) ABSTRACT

A touch-type panel structure for a vehicle that is employed to operate electronic equipment, an air conditioning apparatus, or the like that is mounted in a vehicle, and a method of manufacturing the touch-type panel structure for a vehicle. The touch-type panel structure for a vehicle includes a touch film whose touch by a user is detected; and a transfer film arranged on a surface of a touch panel that is in a direction opposite to a direction in which a base film is arranged, wherein the touch film is formed of a multiplicity of electro-conductive plastics that have electro-conductivity; and a thermoplastic combined with the multiplicity of electro-conductive plastics.

3 Claims, 7 Drawing Sheets

(58) Field of Classification Search
CPC ............ B60K 2370/1434; B60K 35/10; B60K 2360/1434; B60K 2360/92; B29C 45/0441; B29C 45/1418; B29C 45/14467; B29C 2045/0466; B29C 2045/14237; B32B 27/302; B32B 27/304; B32B 27/365; B32B 37/025; B32B 2457/20; B32B 2457/208
See application file for complete search history.

(56) References Cited

U.S. PATENT DOCUMENTS

| | | | |
|---|---|---|---|
| 2009/0200148 A1* | 8/2009 | Honmatsu | H01H 13/704 200/5 A |
| 2010/0084616 A1* | 4/2010 | Brule | H01B 1/24 264/105 |
| 2010/0102801 A1* | 4/2010 | Takahashi | F16C 41/007 324/207.25 |
| 2014/0160369 A1* | 6/2014 | Jeon | G02F 1/13338 445/24 |
| 2016/0072504 A1* | 3/2016 | Moon | H03K 17/962 200/600 |
| 2017/0126228 A1* | 5/2017 | Gerken | H03K 17/9622 |
| 2019/0073055 A1* | 3/2019 | Nakai | B32B 15/20 |

FOREIGN PATENT DOCUMENTS

| | | | |
|---|---|---|---|
| KR | 2013-0039421 | 4/2013 | |
| KR | 10-2146739 | 8/2020 | |
| WO | WO-2016018030 A1 * | 2/2016 | ............ G06F 3/041 |

OTHER PUBLICATIONS

English Language Abstract of KR 2009-0071602 published Jul. 1, 2009.

English Language Abstract of KR 2013-0039421 published Apr. 22, 2013.

\* cited by examiner

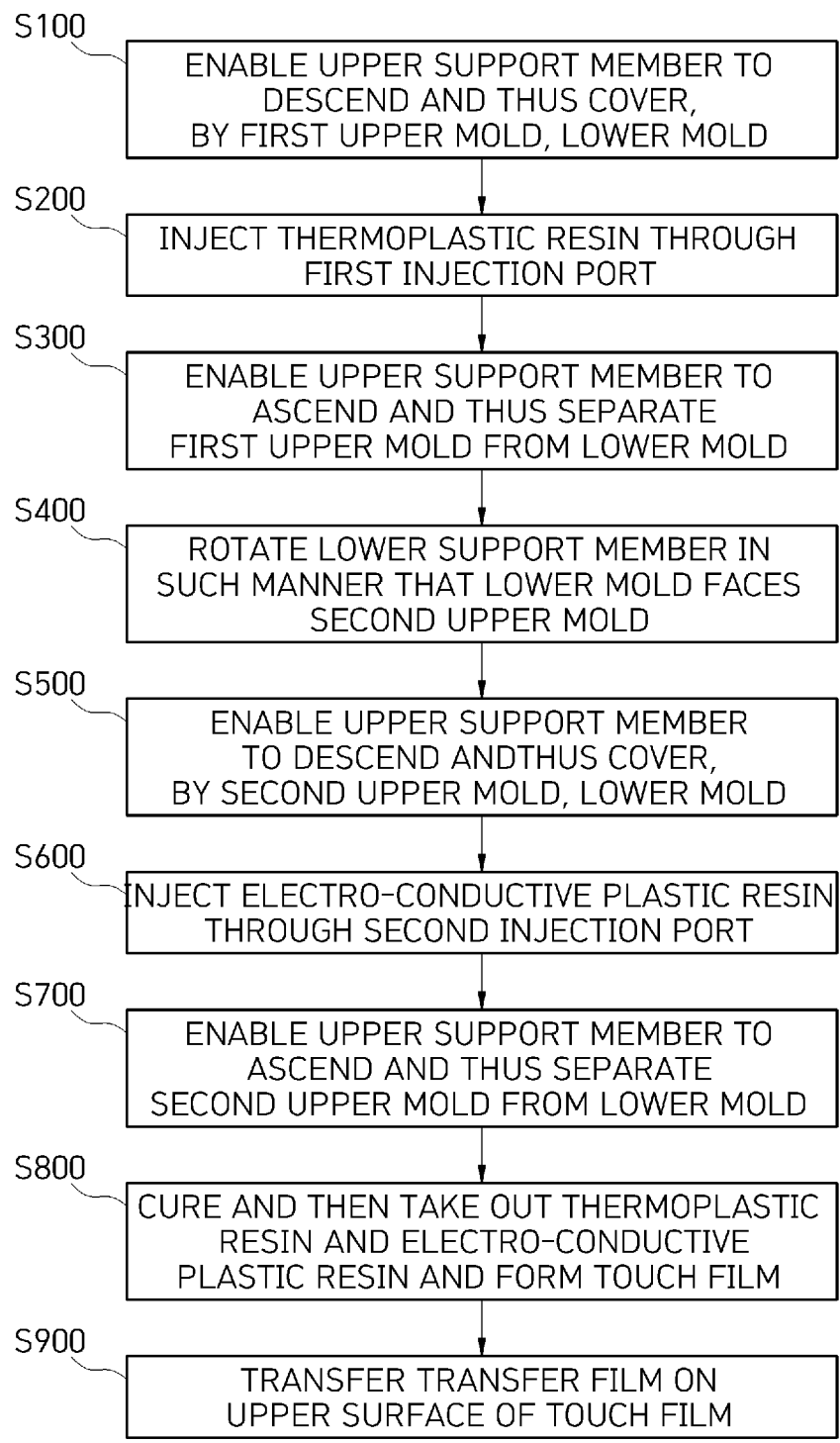

TOUCH-TYPE PANEL STRUCTURE FOR VEHICLE AND METHOD OF MANUFACTURING SAME

CROSS-REFERENCE TO RELATED APPLICATION

This application claims priority to and the benefit of Korean Patent Application No. 10-2022-0057925, filed on May 11, 2022, the disclosure of which is incorporated herein by reference in its entirety.

BACKGROUND

Technical Field

The present disclosure relates to a touch-type panel and, more particularly, to a touch-type panel structure for a vehicle that is employed to operate electronic equipment, an air conditioning apparatus, or the like that is mounted in a vehicle and a method of manufacturing the touch-type panel structure for a vehicle.

Related Art

In recent years, with developments in the automotive industry, various types of vehicles, each with new specifications, have been supplied to the market every year.

Vehicles are required not only to function as a means of transportation, but also to function as a means of providing various conveniences in order for occupants including a driver to enjoy more stable and comfortable driving.

Accordingly, new technologies for realizing the various convenient functions have been applied to the outside and the inside of the vehicle in order to meet customer needs or to improve product competitiveness.

In recent years, in association with these functions, an in-vehicle infotainment (IVI) system has been added to existing systems, such as electronic equipment and a stationary apparatus.

In most cases, electronic equipment, an air conditioning apparatus, and the like, each including this IVI system, are operated by touching a multiplicity of touch panels mounted to provide a customer with operational convenience.

With the technology development of the electronic equipment, the air conditioning apparatus, and the IVI system, various types of touch panels have been used.

Usually, these touch panels, as illustrated in FIG. 1, are realized through insert molding laminate (IML) injection using a polyester (PET) film and an indium tin oxide (ITO) electrode that constitute an electrode film, an optical clear adhesive (OCA) film, a polycarbonate (PC) injection product, and an ITO touch film.

Specifically, to realize the touch panel, an electrode film is formed by stacking the ITO electrode on top of the PET film.

Then, the OCA film that is an optical transparent adhesive film is stacked between the ITO electrode and the PC injection product in such a manner that the PC injection product is stacked on top of the ITO electrode. Thus, the ITO touch film adheres to a lower surface of the PC injection product.

However, in a case where the ITO touch film is used, the touch panel formed as described above has a low degree of freedom of injection. Thus, in a case where a touch panel having a curved surface, for example, a curved display device is realized, a crack may occur on the ITO touch film. Thus, there is a problem in that a defect rate is increased.

Because the ITO electrode is necessary as described above, there is a problem in that the number of components, the number of assembling processes, and the cost for realizing the touch panel are increased.

Particularly, there is a need for the ITO electrode to pass through a transparent plastic, an adhesion layer, and the like. Thus, a distance over which conductivity takes place in the touch panel is increased. Accordingly, there is a problem in that a touch recognition ratio of the touch panel is low.

In addition, in the related art, there is a need to connect a PCB and the touch panel to each other through a separate connector.

An operator personally performs assembling by personally performing an operation of connecting the connector to the PCB and the touch film.

Therefore, since the operator personally connects the connector to the PCB and the touch film, there is a problem in that the assembling man-hour and the cost for manufacturing the touch film are increased.

SUMMARY

An object of the present disclosure, which is made to solve the above-mentioned problems, is to provide a touch-type panel structure for a vehicle, the structure capable of reducing a distance over which conductivity takes place in a touch panel, and a method of manufacturing the touch-type panel structure for a vehicle. With this touch-type panel structure, the degree of freedom of design can be increased, and the number of components, the number of assembling processes, and the manufacturing cost can be reduced.

The above-mentioned object of the present disclosure, a different object, an advantage, and a feature of the present disclosure, and methods of achieving the objects, the advantage and the feature will be apparent from embodiments that will be described in detail below with reference to the accompanying drawings.

In order to accomplish the above-mentioned object, according to an aspect of the present disclosure, there is provided a touch-type panel structure for a vehicle, the touch-type panel structure including: a touch film whose touch by a user is detected; and a transfer film arranged on an upper surface of the touch film, wherein the touch film is formed of: a multiplicity of electro-conductive plastics that have electro-conductivity; and a thermoplastic combined with the multiplicity of electro-conductive plastics.

In the touch-type panel structure, the electro-conductive plastic and the thermoplastic may be combined with each other using a double injection molding technique.

In the touch-type panel structure, the electro-conductive plastic and the thermoplastic may be combined with each other after the electro-conductive plastic and the thermoplastic are each injection-molded.

In the touch-type panel structure, the electro-conductive plastic may consist of any one of polyacetylene, polypyrrole, polythiophene, PEDOT, and polyaniline or may consist of a combination thereof.

In the touch-type panel structure, the thermoplastic may consist of any one of polycarbonate, polystyrene, and polyvinyl chloride or may consist of a combination thereof.

In order to accomplish the above-mentioned object, according to another aspect of the present disclosure, there is provided a touch-type panel structure for a vehicle, the touch-type panel structure including a touch film whose touch by a user is detected; and an electro-magnetic interference (EMI) shielding gasket electrically connecting the touch film and a PCB to each other.

In the touch-type panel structure, the EMI shielding gasket may include: a sponge constituting a body; and an electro-conductive film surrounding the outside of the sponge.

In the touch-type panel structure, which is manufactured by a manufacturing apparatus comprising: an apparatus for manufacturing a touch-type panel structure for a vehicle in which an electro-conductive plastic and a thermoplastic that constitute a touch film are capable of being combined with each other using a double injection molding technique, the apparatus including: a first upper mold into which thermoplastic resin is injected; a lower mold inside which the thermoplastic resin injected from the first upper mold is accommodated; a second upper mold into which electro-conductive plastic resin is injected; an upper support member to a lower surface of which the first upper mold and the second upper mold are fixed in such a manner as to be spaced a distance apart from each other, the upper support member selectively ascending and descending along an upward-down direction; and a lower support member formed in the shape of a circular plate and arranged in such a manner as to be spaced a distance apart downward from the upper support member, the lower mold being fixed to an upper surface of the lower support member, a rotational shaft being combined with the center of the lower support member, and thus the lower support member being selectively rotated about the rotational shaft.

In the touch-type panel structure, the first upper mold may include: a first base unit constituting a body; and a multiplicity of first injection ports passing through the first base unit from one surface thereof to the opposite surface thereof, and the second upper mold may include: a second base unit constituting a body; and a multiplicity of second injection ports passing through the second base unit from one surface thereof to the opposite surface thereof.

In the touch-type panel structure, a protrusion that forms a space, in which the electro-conductive plastic resin is accommodated, in one portion of the thermoplastic resin may extend from a lower surface of the first base unit.

In the touch-type panel structure, the protrusion may be formed at a position that faces the second injection port.

In order to accomplish the above-mentioned object, according to still another aspect of the present disclosure, there is provided a method of manufacturing a touch-type panel structure for a vehicle in which an electro-conductive plastic and a thermoplastic that constitute a touch film are combined with each other using a double injection molding technique, the method including: enabling an upper support member to descend and thus covering, by a first upper mold, a lower mold; injecting thermoplastic resin forming a thermoplastic through a first injection port formed in the first upper mold; enabling the upper support member to ascend and thus separating the first upper mold from the lower mold; rotating a lower support member on an upper surface of which the lower mold is arranged, in such a manner that the lower mold faces a second upper mold into which electro-conductive plastic resin is injected; enabling the upper support member to descend and thus covering, by the second upper mold, the lower mold; injecting the electro-conductive plastic resin forming the electro-conductive plastic through a second injection port; enabling the upper support member to ascend and thus separating the second upper mold from the lower mold; and curing the thermoplastic resin and the electro-conductive plastic resin and thus forming a touch film.

The method may further include transferring a transfer film on an upper surface of the touch film.

According to the present disclosure, the touch film may be easily manufactured based on predetermined design specifications in such a manner as to have the same structure as the curved display or the like that has a curved surface. Thus, the shape of the touch film is less limited. Performance of the touch film as a material can be improved.

Since the touch film is formed by combining the thermoplastic and the electro-conductive plastic with each other using double injection molding technique, an OCA layer and a base film in the relate art may be omitted. Thus, a process of manufacturing the touch film can be simplified. Moreover, a product production lead time can be shortened in the process of manufacturing the touch film, and the number of assembling processes and the number of back-end processes can be reduced. Thus, the manufacturing cost can be reduced.

In addition, an entire thickness of a touch structure is decreased. Thus, a touch recognition ratio of the electro-conductive plastic can be effectively improved.

BRIEF DESCRIPTION OF THE DRAWINGS

FIG. 5 is a flowchart illustrating a method of manufacturing the touch-type panel structure for a vehicle according to a fourth embodiment of the present disclosure.

DETAILED DESCRIPTION

Figure 1:
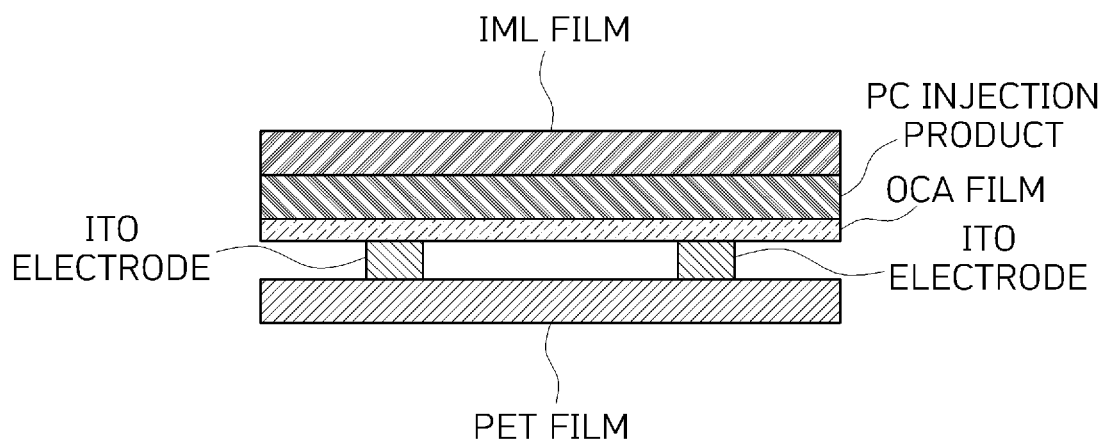
FIG. 1 is a schematic view illustrating a cross section of a touch film in the related art.

Embodiments of the present disclosure are described in sufficient detail to enable a person of ordinary skill in the art to make and use the present disclosure. Various modifications may be made to the embodiments described above. The present disclosure is not limited to the embodiments described below. Moreover, the embodiments are described in such full and clear terms as to completely disclose the technical idea of the present to a person of ordinary skill in the art. In addition, for convenience and clarity in description, a constituent element is illustrated in non-exact proportion in the drawings. The same numeral reference refers to the same constituent element in the drawings. The phrase "and/or is used in the present specification to include two or more words, two or more phrases, or two or more clauses or include one of the two or more words, one of the two or more phrases, or one of the two or more clauses.

Terms are used in the present specification to describe a specific embodiment, and the present disclosure is not limited thereto.

Unless otherwise mentioned in context, a singular noun or a singular noun phrase may have a plural meaning through the present specification. The terms "comprising" and/or "comprising" that are used in the present specification are intended to indicate that a shape, a number, a step, an operation, a member, a constituent element, and/or a group thereof, which are mentioned in the specification, are present, and do not preclude the presence or addition of one or more other shapes, numbers, steps, operations, members, constituent elements, and/or groups thereof.

A touch-type panel structure for a vehicle according to a first embodiment of the present disclosure will be described in detail below with reference to the accompanying drawings.

Figure 2:
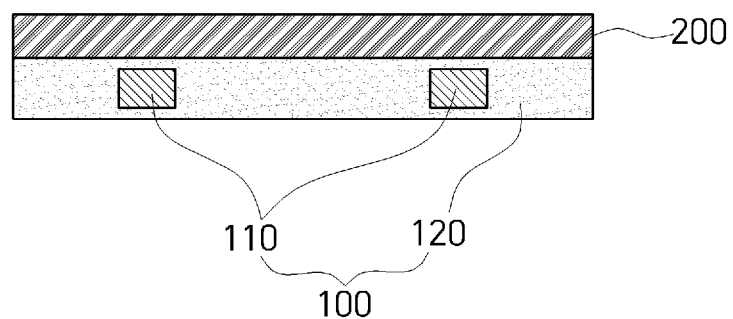
FIG. 2 is a schematic view illustrating a cross section of a touch-type panel structure for a vehicle according to a first embodiment of the present disclosure.

FIG. 2 is a schematic view illustrating a cross section of the touch-type panel structure for a vehicle according to the first embodiment of the present disclosure.

With reference to FIG. 2, the touch-type panel structure for a vehicle according to the first embodiment of the present disclosure includes a touch film 100 and a transfer film 200.

A touch of the touch film 100 by a user or a driver is detected. The touch film 100 is formed on a predetermined region of a button unit into which a touch signal generated by the button unit may be input when the user or the driver touches the button unit in electronic equipment, an air conditioning apparatus, and an IVI system.

The touch film 100 may have a thickness of approximately 1 μm to 5 μm and preferably 3 μm to 5 μm.

The touch film 100 is formed of a thermoplastic 120 and an electro-conductive plastic 110.

The thermoplastic 120 has the plastic property of being melted when heated and being hardened when cooled and forms a body of the touch film 100.

The thermoplastic 120 consists of any one of polycarbonate, polystyrene, and polyvinyl chloride, or consists of a combination thereof.

A multiplicity of electro-conductive plastics 110 that have electro-conductivity as a characteristic material property thereof are provided.

The electro-conductive plastic 110 is formed as an electro-conductive pattern that serves as an electrode when used in the electronic equipment, the air conditioning apparatus, and the IVI system.

The electro-conductive plastic 110 consists of any one of polyacetylene, polypyrrole, polythiophene, PEDOT, and polyaniline, or consists of a combination thereof.

Accordingly, the chemical resistance of the touch film 100 may be secured. Therefore, the touch film 100 may find wide application in the electronic apparatus, the air conditioning apparatus, and the IVI system that has a similar curved surface to a curved display.

The touch film 100 is formed by combining the electro-conductive plastic 110 and the thermoplastic 120 with each other using a double injection molding technique.

Accordingly, the touch film 100 according to the present disclosure may be easily manufactured on the basis of predetermined design specifications in such a manner as to have the same structure as the curved display or the like that has a curved surface. Thus, the shape of the touch film 100 is less limited. Performance of the touch film 100 as a material can be improved.

In addition, since the touch film 100 according to the present disclosure is formed by combining the thermoplastic 120 and the electro-conductive plastic 110 with each other using the double injection molding technique, an OCA layer in the related art may be omitted.

Since the thermoplastic 120 is combined with the electro-conductive plastic 110 using the double injection molding technique, the thermoplastic 120, when cured and hardened, may support the electro-conductive plastic 110. Thus, a base film in the related art may be omitted.

Accordingly, an OCA film and an ITO electrode may be omitted from the touch film 100 according to the present disclosure, and thus a process of manufacturing the touch film 100 may be simplified. Accordingly, a product production lead time can be shortened in the process of manufacturing the touch film 100, and the number of assembling processes and the number of back-end processes can be reduced. Thus, the manufacturing cost can be reduced.

Since the OCA film and the base film are omitted from the touch film 100 according to the present disclosure, an entire thickness of a touch structure is decreased. Thus, a touch recognition ratio of the electro-conductive plastic 110 can be effectively improved.

In a modification example of the first embodiment of the present disclosure, in the touch-type panel structure for a vehicle, as long as the electro-conductive plastic 110 may be combined with the thermoplastic 120, it is also possible that the electro-conductive plastic 110 is combined with the thermoplastic 120 after they are each injection-molded.

The transfer film 200 is arranged on an upper surface of the touch film 100 and is transferred to an upper surface of a touch panel.

A touch-type panel structure for a vehicle according to a second embodiment of the present disclosure may include an electro-magnetic interference shielding (EMI) gasket 300.

Figure 3:
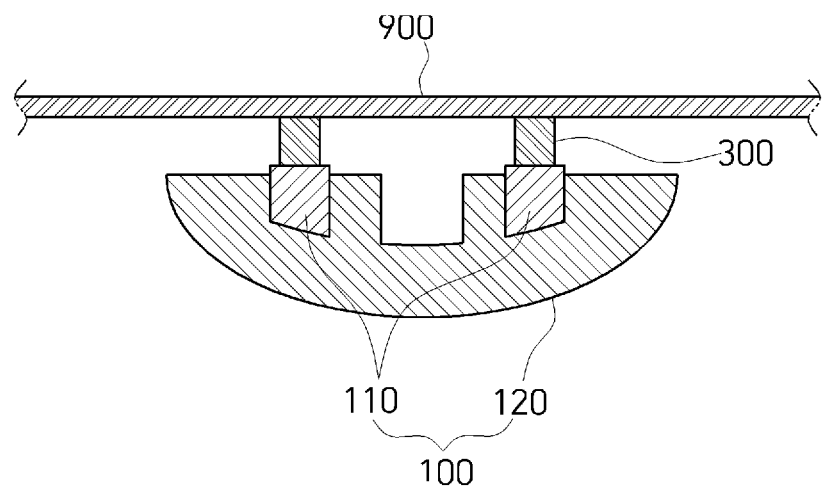
FIG. 3 is a schematic view illustrating a cross section of a touch-type panel structure for a vehicle according to a second embodiment of the present disclosure.

FIG. 3 is a schematic view illustrating a cross section of the touch-type panel structure for a vehicle according to the second embodiment of the present disclosure.

With reference to FIG. 3, the touch-type panel structure for a vehicle according to the second embodiment includes the touch film 100 and the EMI gasket 300.

Only the EMI gasket 300 will be described below that distinguishes the touch-type panel structure for a vehicle according to the second embodiment of the present disclosure from the touch-type panel structure for a vehicle according to the first embodiment of the present disclosure.

The EMI gasket 300 is arranged at a position that faces the electro-conductive plastic 110 and is electrically connected to a PCB 900.

The EMI gasket 300 includes a sponge constituting a body and an electro-conductive film surrounding the outside of the sponge.

That is, it is possible that the EMI gasket 300 that has an excellent electric conductivity, heat resistance, and corrosion resistance is automatically mounted without performing soldering for fixing a connector in the related art.

Particularly, since the EMI gasket 300 includes a sponge that is an elastic material, a scratch may be suppressed from occurring on respective contact surfaces of constituent elements, for example, the electro-conductive plastic 110 and the PCB 900, with which the EMI gasket 300 is brought into contact.

The EMI gasket 300 eliminates the need for the connector in the related art with which an operator connects the PCB and the touch-type panel structure for a vehicle to each other. Thus, the assembling man-hour and the cost for manufacturing the touch-type panel structure for a vehicle can be reduced.

An apparatus for manufacturing the touch-type panel structure for a vehicle according to a third embodiment of the present disclosure will be described in detail below with reference to the accompanying drawings.

Figure 4:
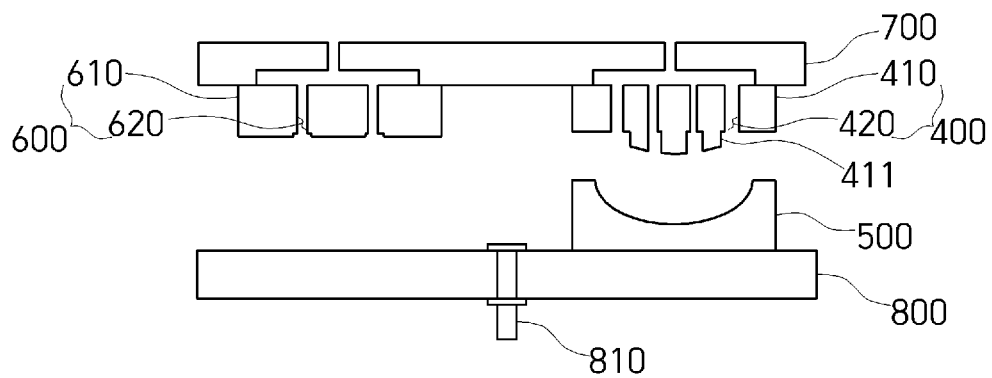
FIG. 4 is a cross-sectional view illustrating an apparatus for manufacturing the touch-type panel structure for a vehicle according to a third embodiment of the present disclosure.

FIG. 4 is a cross-sectional view illustrating the apparatus for manufacturing the touch-type panel structure for a vehicle according to the third embodiment of the present disclosure.

With reference to FIG. 4, the apparatus for manufacturing the touch-type panel structure for a vehicle according to the third embodiment of the present disclosure in which the electro-conductive plastic 110 and the thermoplastic 120, which constitute the touch film 100, are combined with each other using the double injection molding technique includes a first upper mold 400, a lower mold 500, a second upper mold 600, an upper support member 700, and a lower support member 800.

Thermoplastic resin that forms the thermoplastic 120 of the touch film 100 is injected into the first upper mold 400 from the outside.

The first upper mold includes a first base unit 410 and a first injection port 420.

The first base unit 410 constitutes a body of the first upper mold 400.

The first injection port 420 passes through the first base unit 410 from one surface thereof to the opposite surface thereof. The thermoplastic resin is injected through the first injection port 420 from the outside.

The thermoplastic resin that is injected from the first upper mold 400 is accommodated inside the lower mold 500.

The lower mold 500 is arranged at a position that faces the first upper mold 400, in such a manner as to be spaced a distance apart downward from the first upper mold 400.

That is, the lower mold 500 may precisely accommodate the thermoplastic resin injected through the first upper mold 400.

Electro-conductive plastic resin that forms the electro-conductive plastic 110 of the touch film 100 is injected into the second upper mold 600 from the outside.

The second upper mold 600 includes a second base unit 610 and a second injection port 620.

The second base unit 610 constitutes the body of the first upper mold 400.

A multiplicity of the second injection ports 620 pass through the second base unit 610 from one surface thereof to the opposite surface thereof, and the electro-conductive plastic resin is injected through the multiplicity of the second injection ports 620 from the outside.

The first upper mold 400 and the second upper mold 600 are fixed on a lower surface of the upper support member 700 in such a manner as to be spaced a distance apart from each other.

The upper support member 700 selectively enables the first upper mold 400 and the second upper mold 600 to ascend and descend in an upward-downward direction.

In this case, depending on the end-use environment, each of the first upper mold 400 and the second upper mold 600 may be fixed to the upper support member 700, and thus the upper support member 700 may enable each of the first upper mold 400 and the second upper mold 600 to ascend and descend.

The lower support member 800 is formed in the shape of a circular plate and is arranged in such a manner as to be spaced a distance apart downward from the upper support member 700.

The lower mold 500 is fixed to an upper surface of the lower support member 800, and a rotational shaft 810 is combined with the center of the lower support member 800.

The lower support member 800 is selectively rotated about the rotational shaft 810.

A protrusion 411 is formed on a lower surface of the first base unit 410.

The protrusion 411 serves to form a space, in which the electro-conductive plastic resin is accommodated, in the thermoplastic resin.

The protrusion 411 is formed at a position on the first base unit 410 that faces the second injection port 620 in the second base unit 610.

The thermoplastic resin is injected into the lower mold 500 from the first injection port 420 in the first upper mold 400. Then, the lower support member 800 is rotated about the rotational shaft 810, and the lower mold 500 is arranged at a position that faces the second upper mold 600. At this time, specifically, the protrusion 411 is formed at a position that faces the second injection port 620 in the second base unit 610.

Therefore, when the electro-conductive plastic resin injected from the second injection port 620 is injected, the protrusion 411 on the first base unit 410 may form the space for accommodating the electro-conductive plastic resin in the thermoplastic resin.

That is, the touch-type panel structure for a vehicle according to the present disclosure may be easily manufactured with the manufacturing apparatus including the first upper mold 400, the lower mold 500, the second upper mold 600, the upper support member 700, and the lower support member 800.

A method of manufacturing the touch-type panel structure for a vehicle according to the present disclosure in which the electro-conductive plastic 110 and the thermoplastic 120, which constitute the touch film 100, are combined with each other using the double injection molding technique will be described in detail below with reference to the accompanying drawings.

Figure 6A:
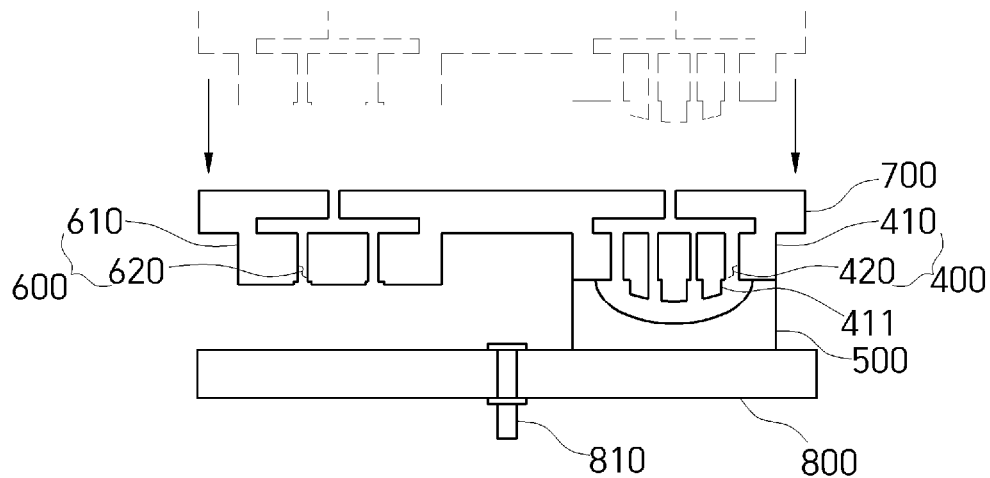
FIGS. 6A to 6H are views illustrating steps, respectively, of manufacturing a touch film using the apparatus for manufacturing the touch-type panel structure for a vehicle according to the third embodiment of the present disclosure.

FIG. 5 is a flowchart illustrating a method of manufacturing the touch-type panel structure for a vehicle according to a fourth embodiment of the present disclosure. FIGS. 6A to 6H are views illustrating steps, respectively, of manufacturing the touch film 100 using the apparatus for manufacturing the touch-type panel structure for a vehicle according to the third embodiment of the present disclosure As illustrated in FIGS. 5 and 6A, first, the upper support member 700 descends, and thus the first upper mold 400 covers the lower mold 500 (S100).

Figure 6B:
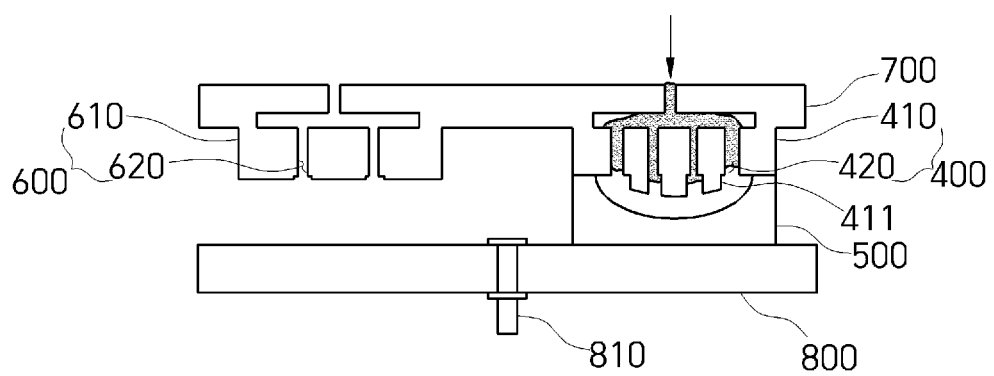

Then, as illustrated in FIGS. 5 and 6B, the thermoplastic resin that forms the thermoplastic 120 is injected through the first injection port 420 formed in the first upper mold 400 (S100).

Figure 6C:
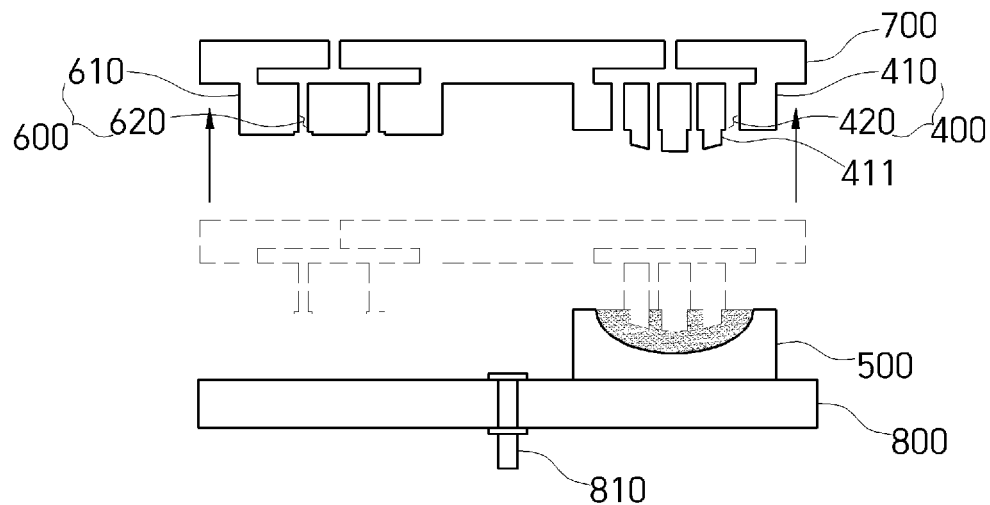

Subsequently, as illustrated in FIGS. 5 and 6C, the upper support member 700 is enabled to ascend, and thus the first upper mold 400 is separated from the lower mold 500 (S200).

Figure 6D:
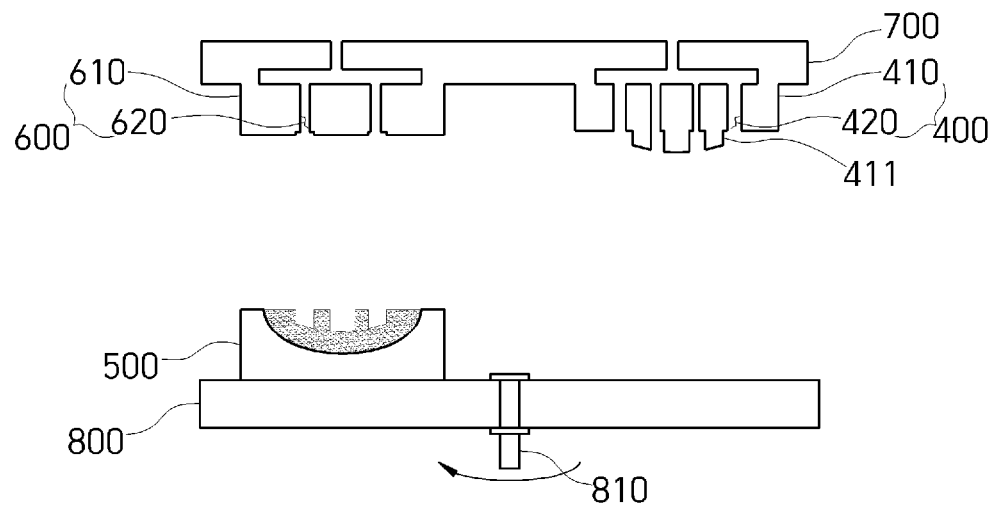

Subsequently, as illustrated in FIGS. 5 and 6D, the lower support member 800 on an upper surface of which the lower mold 500 is arranged is rotated in such a manner that the lower mold 500 faces the second upper mold 600 into which the electro-conductive plastic resin is injected (S400).

Figure 6E:
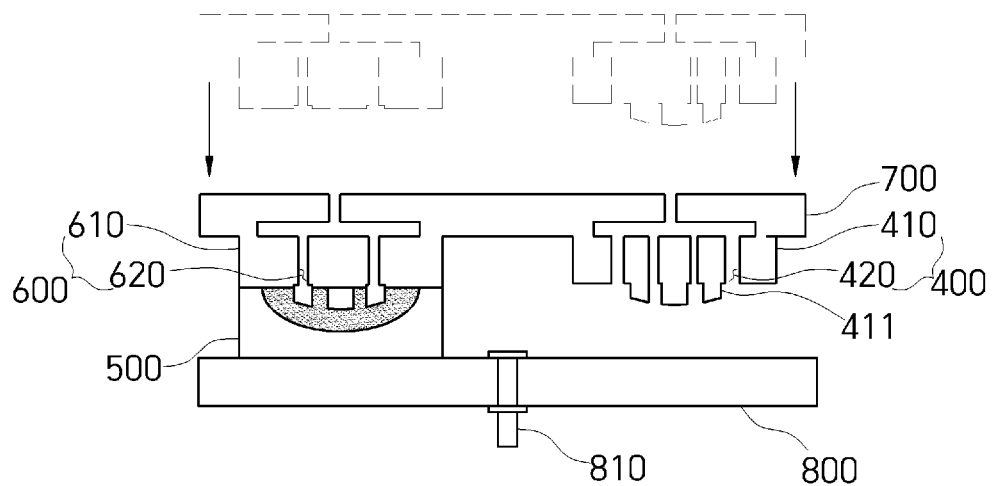

Then, as illustrated in FIGS. 5 and 6E, the upper support member 700 descends, and thus the second upper mold 600 covers the lower mold 500 (S500).

Figure 6F:
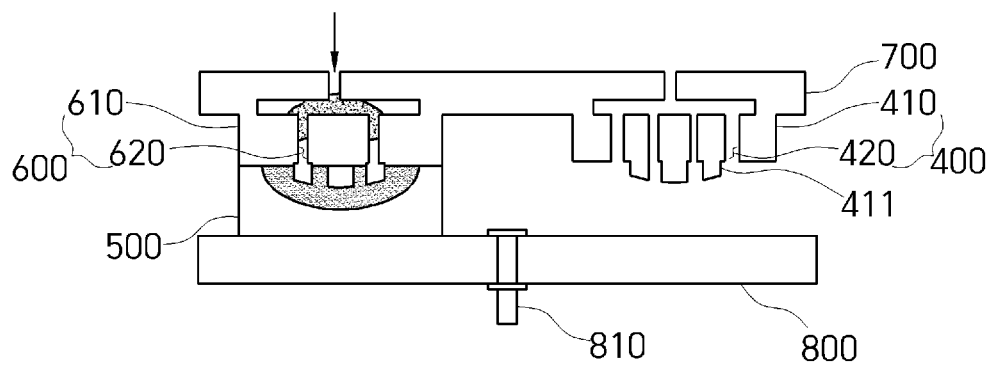

Subsequently, as illustrated in FIGS. 5 and 6F, the electro-conductive plastic resin that forms the electro-conductive plastic 110 is injected through the second injection port 620 formed in the second upper mold 600 (S600).

Figure 6G:
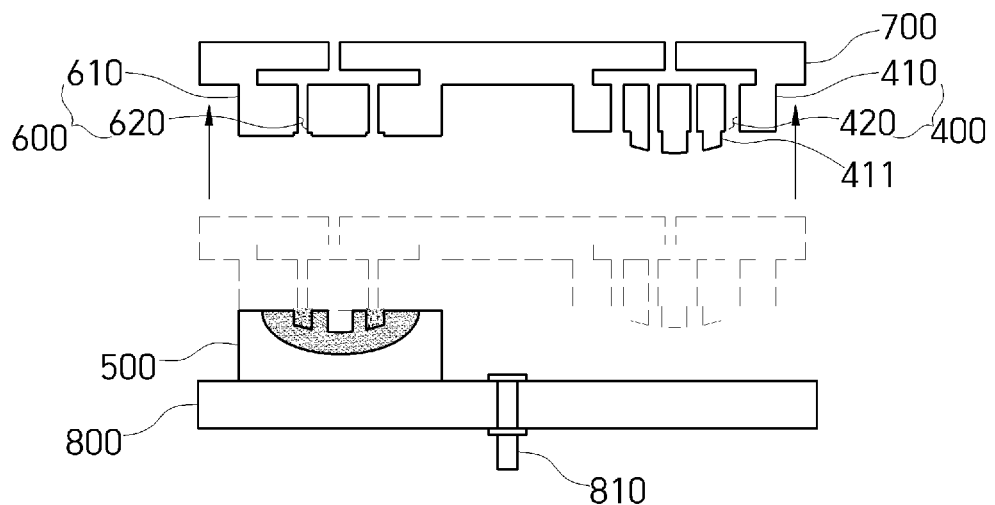

Subsequently, as illustrated in FIGS. 5 and 6G, the upper support member 700 is enabled to descend, and thus the second upper mold 600 is separated from the lower mold 500 (S700).

Figure 6H:
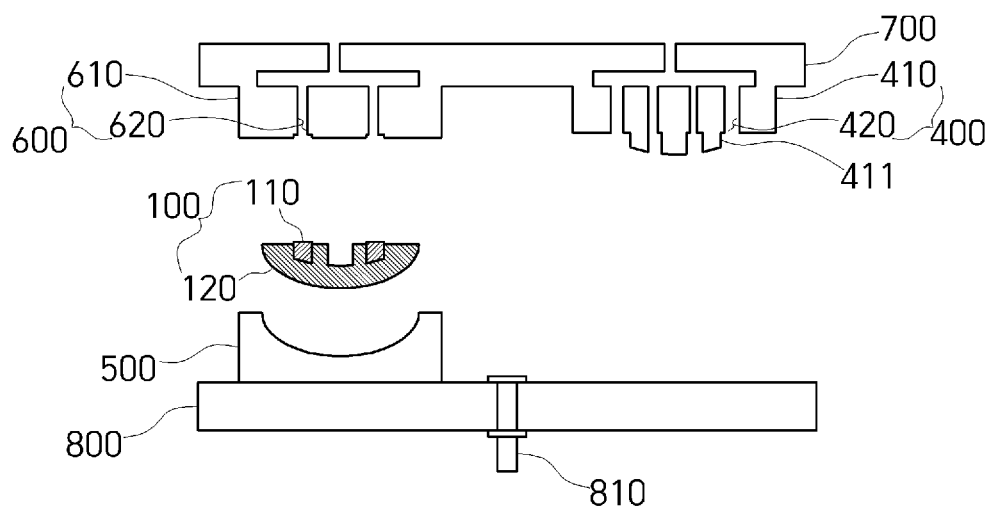

Subsequently, as illustrated in FIGS. 5 and 6H, the thermoplastic resin and the electro-conductive plastic resin are cured, and the cured thermoplastic resin and electro-conductive plastic resin are taken out, and the touch film 100 that is formed of the electro-conductive plastic 110 and the thermoplastic 120 is formed (S800).

The touch film 100 according to the present disclosure is manufactured through the manufacturing steps as described above.

Then, as described in FIG. 5, the touch film 100 is transferred to an upper surface of the transfer film 200 (S900).

At this time, a film is inserted into a film formed of a thin PET material or a material such as PC or PMMA by forming and printing a thin film thereon, and at the same time, injection molding is performed. In this manner, the transfer film 200 may be realized.

The touch-type panel structure for a vehicle is finally manufactured by performing these steps.

As described above, the touch-type panel structure for a vehicle according to the first embodiment of the present disclosure may be easily manufactured on the basis of predetermined design specifications in such a manner as to have the same structure as the curved display or the like that has a curved surface. Thus, the shape of the touch film 100 is less limited. The performance of the touch film 100 as a material can be improved.

Furthermore, since the touch film 100 is formed by combining the thermoplastic 120 and the electro-conductive plastic 110 with each other using the double injection molding technique, the OCA film and the base film may be omitted. Thus, the process of manufacturing the touch film 100 may be simplified. Accordingly, the product production lead time can be shortened in the process of manufacturing the touch film 100, and the number of assembling processes and the number of back-end processes can be reduced. Thus, the manufacturing cost can be reduced.

In addition, the entire thickness of the touch structure is decreased, and thus the touch recognition ratio of the electro-conductive plastic 110 can be effectively improved.

The embodiments disclosed in the present specification should be considered in terms of the description being provided in exemplary forms, instead of in terms of the description being provided in a limited manner. The scope of the present disclosure is defined by the claims instead of from the description provided above. Equivalents of the embodiments should be interpreted as falling within the scope of the present disclosure.

What is claimed is:

1. A touch-type panel structure for a vehicle, the touch-type panel structure comprising:
   a touch film; and
   a transfer film arranged on an upper surface of the touch film,
   wherein the touch film is formed of a multiplicity of electro-conductive plastics double injection molded within preformed cavities of thermoplastic material, the thermoplastic material supporting the multiplicity of electro-conductive plastics exclusive of a substrate.

2. The touch-type panel structure of claim 1, wherein the electro-conductive plastic comprises any one of polyacetylene, polypyrrole, polythiophene, PEDOT, and polyaniline, or a combination thereof.

3. The touch-type panel structure of claim 1, wherein the thermoplastic comprises any one of polycarbonate, polystyrene, and polyvinyl chloride, or a combination thereof.

* * * * *